United States Patent [19]

Handler et al.

[11] Patent Number: 4,921,370

[45] Date of Patent: May 1, 1990

[54] TUBE CONNECTOR

[75] Inventors: Milton E. Handler, Northbrook; Herbert Baisch, Palatine, both of Ill.

[73] Assignee: Hirsh Company, Skokie, Ill.

[21] Appl. No.: 211,986

[22] Filed: Jun. 27, 1988

[51] Int. Cl.$^5$ .............................................. B25G 3/00
[52] U.S. Cl. .................................. 403/234; 403/237; 403/191
[58] Field of Search ................ 403/234, 237, 191, 190

[56] References Cited

U.S. PATENT DOCUMENTS

| | | | |
|---|---|---|---|
| 3,985,460 | 10/1976 | Piper et al. | 403/234 |
| 4,089,613 | 5/1978 | Babbitt, Jr. . | |
| 4,667,916 | 5/1987 | Richards . | |

FOREIGN PATENT DOCUMENTS

| | | |
|---|---|---|
| 1232489 | 5/1971 | United Kingdom . |
| 1405146 | 9/1975 | United Kingdom . |
| 2153214A | 8/1985 | United Kingdom . |

OTHER PUBLICATIONS

Plastiglide's Catalog Sheets (4 pages) for Tube Connectors and Threaded Wedges—no date.

*Primary Examiner*—Andrew V. Kundrat
*Attorney, Agent, or Firm*—Dressler, Goldsmith, Shore, Sutker & Milnamow

[57] ABSTRACT

A connector assembly is provided for connecting a first tube section to a second tube section that has a hollow tubular wall. The assembly includes a base member for being mounted to the first tube section, a collet member for being received in an open end of the second tube section and matingly engaged around the base member, a screw having a head for engaging the first tube section and having an extending threaded shank, and a threaded receiving nut for threadingly engaging the screw shank and urging the collet member axially into increasing mating engagement with the base member when the screw is rotated. The base member and the collet member together define cooperating wedge means for urging at least a portion of the collet member increasingly radially outwardly as the base member and the collet member are increasingly axially engaged so as to force the collet member into tight engagement with the second tube section.

25 Claims, 2 Drawing Sheets

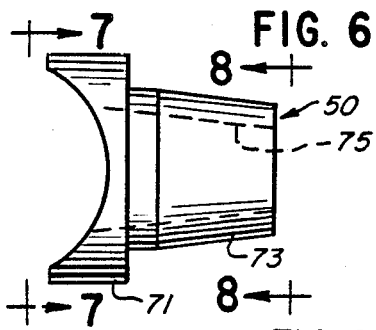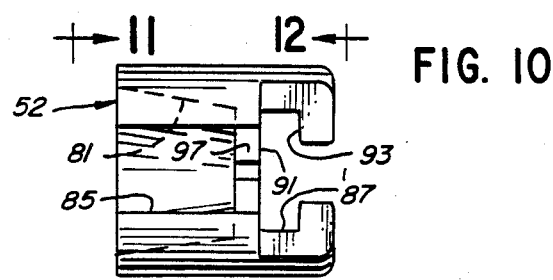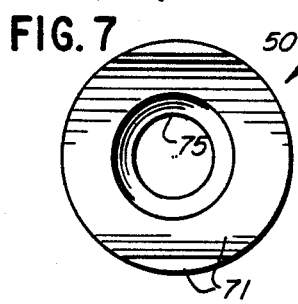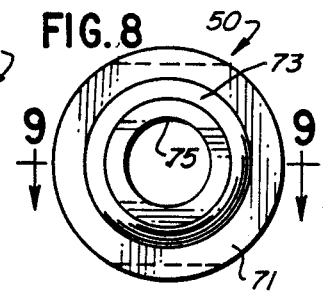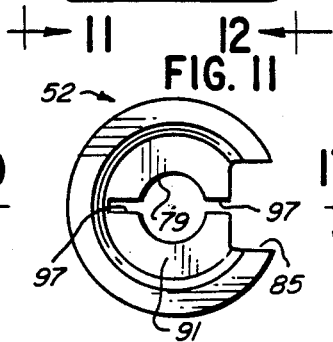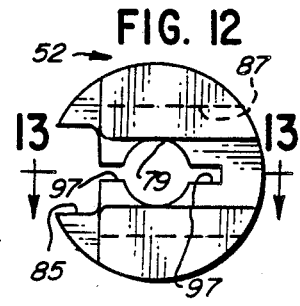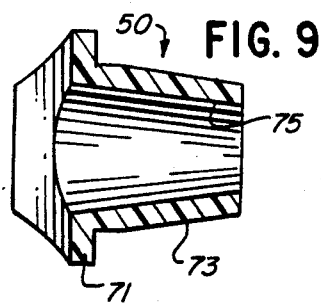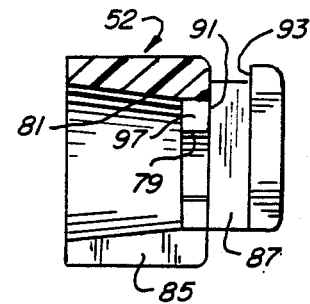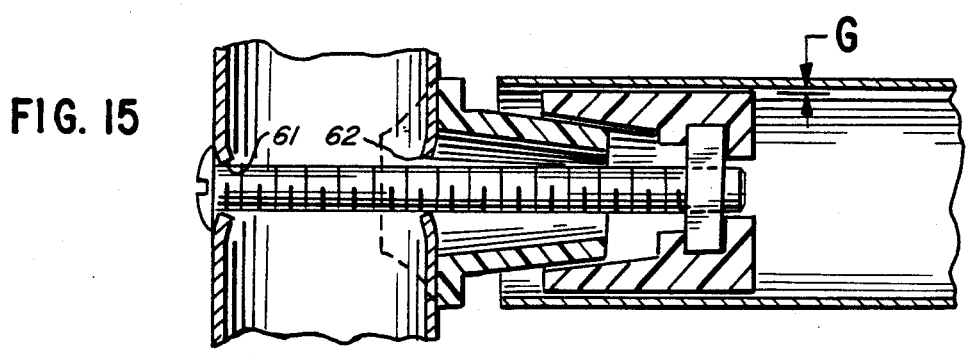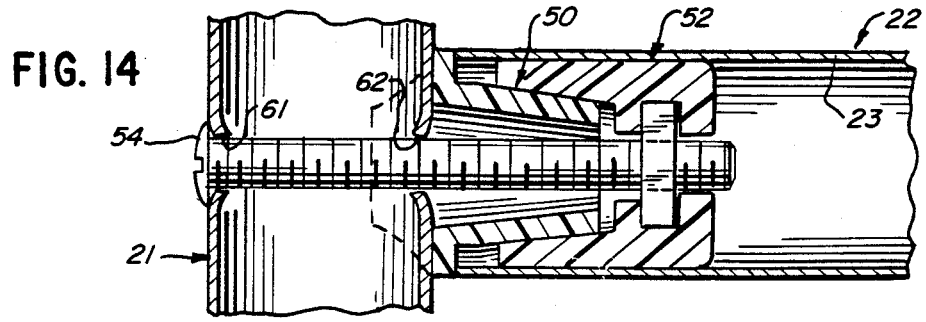

TUBE CONNECTOR

TECHNICAL FIELD

This invention relates to apparatus for connecting together sections of tubing and is particularly suitable for connecting together sections of hollow, cylindrical, metal tubing which have axially oriented, folded metal seams extending longitudinally on the inside of the tubing.

BACKGROUND OF THE INVENTION AND TECHNICAL PROBLEMS POSED BY THE PRIOR ART

A variety of products are fabricated from tubing, especially from hollow, cylindrical, metal tubing. Such products include television stands, infant seats, serving carts, display units, etc. Tube connectors have been developed for rigidly joining tube sections in such products.

The handling and freight costs associated with the marketing of a tubular product can be reduced by shipping a smaller package of unassembled tube sections and other components of the product to the point of purchase. The product can then be subsequently assembled at the point of purchase, such as at a retail store, or at the point of use by the purchaser. In such situations, it would be desirable to provide an improved tube connector which could be readily and relatively easily installed with common, conventional tools by a lay person who is not technically inclined or experienced in the assembly of tubular products.

One type of widely used tubing is fabricated in a cylindrical form from sheet metal and has an internal, longitudinal seam of overlapping, folded, sheet metal. While conventional connectors in use today can be used with such internal seam tubing, such conventional connectors do not accommodate such tubing in a manner that permits a tube section to be rotated about its longitudinal axis to a selected orientation of the seam. This can be disadvantageous when additional components are mounted to the seamed tube section, especially when such components must be mounted to the tube section so as to avoid interference with the tube section seam.

For example, a caster or wheel may be mounted to a tube section with suitable fastener extending through holes formed in the tube section. Typically, the holes for receiving the caster mounting fastener are not formed through the tube section seam which usually comprises two or more overlapping layers of material. Rather, the holes for accommodating the caster fastener are usually formed in the tube section about 90° from the seam. Thus, the design of the product, and subsequent assembly of the tube sections with conventional tube connectors, must accommodate the seam in a manner such that the casters mounted on that tube section will be in the proper orientation to engage the floor. Conventional tube connectors that are specifically designed to accommodate the seam can accommodate the seam in only one position relative to the connected tube sections. This necessarily means that the tube sections cannot be adjusted with respect to the orientation of the seam, and therefore, the position of the caster mounted to one of the tube sections cannot be adjusted either.

It would be desirable to provide an improved tube connector which would permit adjustment of one of the tube sections to any selected rotational orientation. It would be beneficial if such an improved connector could accommodate the internal seam of a tube section and permit that tube section to be rotated to any desired position as may be necessary to properly orient other structures, such as casters, that are mounted to the tube section.

SUMMARY OF THE INVENTION

One form of the present invention includes a connector assembly for connecting a first tube section to a second tube section that has a hollow tubular wall. The assembly includes a base member for being mounted to the first tube section and a collet member for being received in an open end of the second tube section and matingly engaged around the base member. The assembly also includes a fastener means for engaging the first tube section and having an extended threaded portion. Further, the assembly includes a threaded receiving means for threadingly receiving the fastener means threaded portion and urging the collet member axially into increasing mating engagement with the base member when the fastener means is rotated. The base member and the collet member together define cooperating wedge means for urging at least a portion of the collect member increasingly radially outwardly as the base member and collet member are increasingly axially engaged to force the collet member into tight engagement with the second tube section.

Another aspect of the invention may be characterized as a connected assembly of tube sections. This includes the first tube section, the fastener means for engaging the first tube section and having an extended threaded portion, the base member mounted to the first tube section, the second tube section that has a hollow tubular wall defining an open end, the collet member for being received in the open end of the second tube section and matingly engaged around the base member, and the threaded receiving means for threadingly receiving the fastener means threaded portion and urging the collet member axially into increasing mating engagement with the base member when the fastener means is rotated.

In the preferred embodiment of the invention, the connector assembly is adapted for use with tube sections wherein at least the second tube section includes a longitudinal seam protruding on the inside of the hollow tubular wall. The collet member defines a longitudinally oriented slot to receive the interior seam. The second tube section can be rotated to any orientation about its longitudinal axis before the connector assembly is tightened.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 6 is a side elevational view of the base member;

FIG. 7 is a left-hand end view of the base member illustrated in FIG. 6 taken along the plane 7—7 in FIG. 6;

FIG. 8 is a right-hand end view of the base member illustrated in FIG. 6 taken along the plane 8—8 in FIG. 6;

FIG. 9 is a cross-sectional view taken generally along the plane 9—9 in FIG. 8;

FIG. 10 is a side-elevational view of the collet member;

FIG. 11 is a left-hand end view of the collet member illustrated in FIG. 10 taken generally along the plane 11—11 in FIG. 10;

FIG. 12 is a right-hand end view of the collet member illustrated in FIG. 10 taken generally along the plane 12—12 in FIG. 10;

FIG. 13 is a cross-sectional view taken generally the plane 13—13 in FIG. 12;

FIG. 14 is a greatly enlarged, fragmentary, cross-sectional view taken generally along the plane 14—14 in FIG. 3; and FIG. 15 is a view similar to FIG. 14 but showing the components in loose positions before final tightening of the connector assembly components.

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

Figure 1:
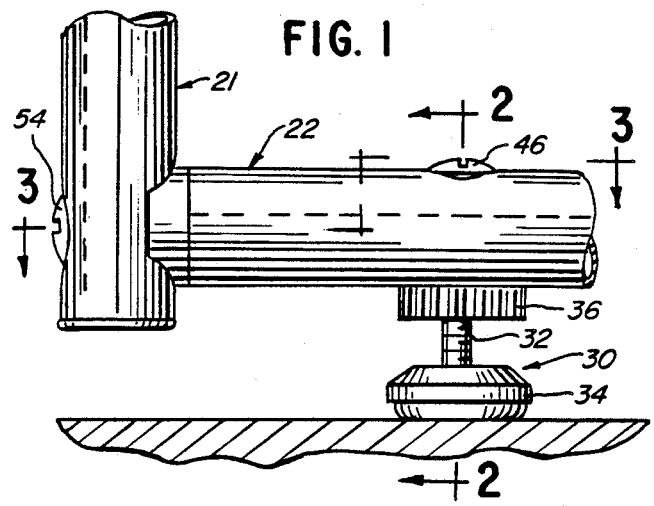
FIG. 1 is a fragmentary, side elevational view of first and second tube sections connected together with a connector assembly of the present invention wherein an adjustable foot is mounted to the second tube section.

Referring now to FIG. 1, the present invention is adapted for use in joining or connecting a first tube section 21 to a second tube section 22 wherein at least the second tube section 22 is hollow. Typically, the first tube section 21 would also be hollow, but the present invention may be used where the first tube section 21 is solid. Further, the present invention is illustrated as being used with cylindrical tube sections which are most commonly used in fabricating conventional tubing products. However, the present invention may be adapted to connect or join non-cylindrical tube sections.

Figure 2:
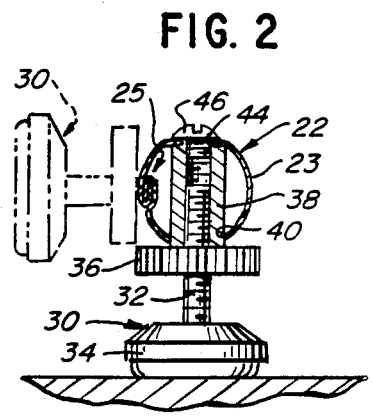
FIG. 2 is a partial cross-sectional view taken generally along the plane 2—2 in FIG. 1 and showing a moved position in phantom as illustrated by dashed lines.

The present invention is particularly well suited for use with hollow, seamed tubing, such as best illustrated in FIG. 2 for the second tube section 22 which has a hollow tubular wall 23 and an internal seam 25. Typically, the hollow tubular wall 23 is fabricated from metal which is formed into a tubular configuration with interlocking, overlapped layers defining the seam 25 on the inside of the hollow tubular wall 23. When the tube section 22 has a cylindrical configuration as illustrated, the seam 25 may be characterized as extending longitudinally and parallel relative to the axis of the tube section 22.

With continued reference to FIGS. 1 and 2, the second tube section 22 can be used to support, or be attached to, other components, such as a conventional adjustable foot assembly 30. The adjustable foot assembly 30 includes a threaded shank 32 to which is mounted a floor engaging member 34 and on which is threadingly engaged an adjustable lock nut 36.

As best illustrated in FIG. 2, the foot assembly 30 includes a bushing 38 which is inserted in a bottom aperture 40 in the tube section 22 and which is internally threaded for engaging the threaded shank 32. An upper aperture 44 is provided at the top of the tube section 22 in alignment with the lower aperture 40 for receiving a screw 46 which is also threadingly engaged with the bushing 38 to hold the bushing 38 in place.

The above-described mounting of the foot assembly 30 to the second tube section 22 is merely illustrative of a variety of components that may be mounted to the second tube section 22 for a variety of purposes. However, with many such components that must be mounted to the second tube section 22 through holes formed in the tube section, the position of the component (e.g., the position of the foot assembly 30 on the tube section 22) relative to the seam 25 must be carefully selected and predetermined by the manufacturer in conventional designs.

Since the seam 25 typically includes a plurality of overlapping portions of tube material, the punching or drilling of a hole through, or immediately adjacent, such a seam 25 is usually undesirable. A greater force or machining effort would typically be required to form a hole through the seam 25. The formation of such a hole through, or immediately adjacent, the seam 25 could unduly distort or damage the seam 25.

Accordingly, a manufacturer typically chooses to form a hole or holes in a tube section about 90° from any tube seam. As a result, components (e.g., the foot assembly 30) mounted through such pre-formed holes in the tube section will necessarily have a fixed position relative to the seam 25. Subsequently, when that section is connected to one or more other tube sections during assembly of the product with conventional connectors that accommodate the seam in only one position, the final orientation of that tube section relative to the other tube sections will have to be specifically pre-determined and maintained in order for the mounted component (e.g., the foot assembly 30) to function as intended.

Thus, if a conventional tube connector were used to connect one tube section to another tube section having such a component mounted therein, the tube connector would accommodate the seam of one of the tube sections at a particular position, and the component mounted to that one tube section would have a non-adjustable orientation predetermined by the mounting holes previously formed in the one tube section by the manufacturer. In such an assembly, final adjustment of the orientation of the one tube section is not possible to accommodate any tolerance variations in the position of the component mounted on the one tube section.

In contrast, as will be shown, the present invention assembly connects tube sections where one (or both) of the tube sections has an internal seam, and the connection assembly permits at least one of the tube sections to be rotated about its longitudinal axis to any desired position so as to properly orient any mounted component (e.g., the foot assembly 30).

Figure 4:
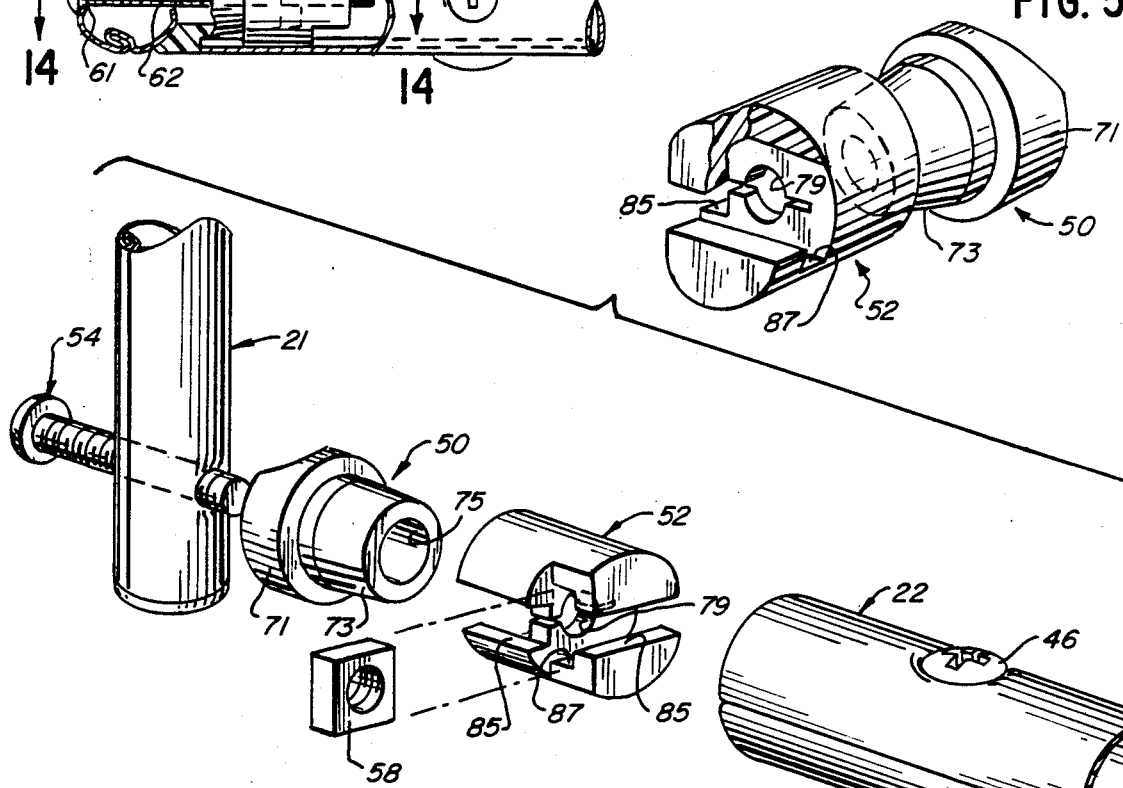
FIG. 4 is a fragmentary, exploded, perspective view of the assembly.
Figure 5:
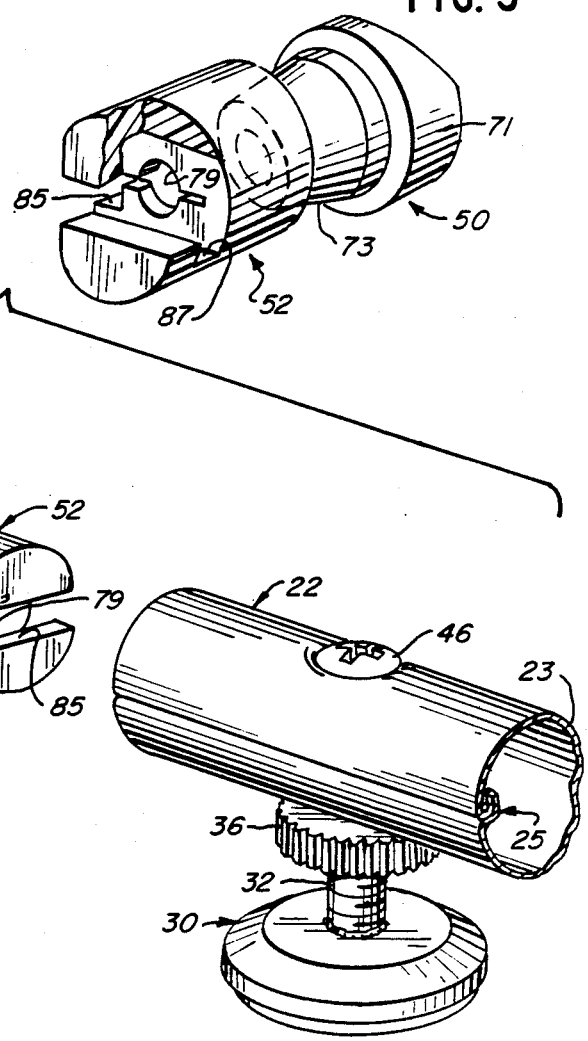
FIG. 5 is a partially exploded view of the tube connector assembly base member and collet member as viewed from the rear in FIG. 4 and with a portion of the collet member broken away to better illustrate interior detail.

With reference to FIGS. 4 and 5, the connector assembly of the present invention includes a base member 50 for being mounted to the first tube section 21, and a collet member 52 for being received in an open end of the second tube section 22 and matingly engaged around the base member 50. The connector assembly of the present invention also includes a fastener means 54 which may be a machine screw as illustrated. The connector assembly also includes a threaded receiving means, such as a nut 58, for threadingly receiving the threaded portion (threaded screw shank) of the fastener means 54.

Figure 3:
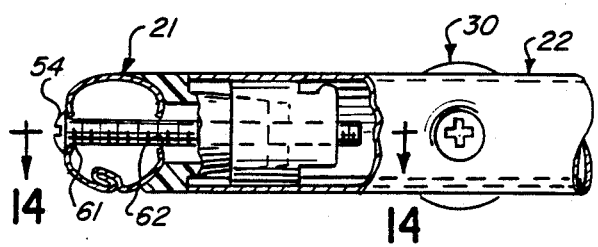
FIG. 3 is a partial, cross-sectional view taken generally along the planes 3—3 in FIG. 1.

In the preferred embodiment illustrated, the first tube section 21 is hollow and defines a pair of aligned apertures 61 and 62 (FIG. 3) for receiving the shank of the screw 54. The head of the screw 54 engages the tube section 21.

The base member 50 includes a saddle portion 71 for being received on the cylindrical surface of the first tube section 21. The base member 50 also includes a frustoconical mandrel 73 having a frustoconical, exterior surface. The base member 50 also defines an internal receiving aperture 75 for receiving an extending portion of the shank of the screw 54.

The collet member 52 is preferably resiliently deformable. Alternatively, the member 52 at least includes a portion which is outwardly expandable. As best illustrated in FIGS. 4, 5, and 10-13, the collet member 52 defines a receiving aperture 79 for being aligned with the base member receiving aperture 75 when the base member 50 and collet member 52 are matingly engaged and for accommodating the shank of the screw 54.

The collet member 52 also defines an frustoconical, interior surface 81 which accommodates the shank of the screw 54 but which more importantly is adapted to matingly engage the frustoconical surface of the base member mandrel 73.

The collet member 52 also defines a longitudinal oriented slot 85 (FIGS. 4, 5, and 10-13) for accommodating or receiving the interior seam 25 of the second tube section 22.

The collet member 52 also defines a cavity 87 (FIGS. 4, 5, and 10) for receiving the nut 58 and for limiting the axial movement of the nut relative to the collet member 52. To this end, as best illustrated in FIGS. 10 and 13, the cavity 87 is defined on its forward end by a wall surface 91 and on its rearward end by wall surfaces 93. The nut 58 may be slid into the cavity 87 of the collet member 52 from either open side of the cavity 87 between the opposing wall surfaces 91 and 93.

Although the nut 58 is illustrated as a separate, and removable, conventional component, it is to be realized that the collet member 52 per se may be provided with threaded receiving means formed integral or unitary with the collet member 52. However, adjustability of the assembly is enhanced by providing a separate threaded receiving means, such as the nut 58.

In the preferred embodiment illustrated, the collet member 52 is fabricated from a resiliently deformable material, such as a suitable thermoplastic material. This permits exterior portions to be expanded outwardly to engage and grip the interior surface of the second tube section 22. The outward expansion of the collet member 52 is further enhanced by providing axial slots 97 in the wall surface 91 as best illustrated in FIGS. 10-13.

When it is desired to connect the first tube section 21 to the second tube section 22, the components are assembled as best illustrated in the exploded view in FIG. 4. The fastener or screw 54 is mounted in the first tube section 21 so that the head of the screw 54 engages the first tube section 21 around the aperture 61 (FIG. 3) and so that the screw shank extends through the aperture 62 and beyond the first tube section 21.

The base member 50 is mounted on the first tube section 21 with the saddle portion 71 being received on the cylindrical surface of the first tube section 21. The frustoconical surface 81 of the collet member 52 is positioned around the frustoconical mandrel 73 of the base member 50 with the shank of the screw 54 extending through the base member 50 and into the collet member 52. The nut 58 is disposed within the cavity 87 of the collet member 52 and is threadingly engaged with the threaded shank of the screw 54.

With the parts still relatively loose, the second tube section 22 is then positioned to receive the collet member 52. Relative movement is effected between the collet member 52 and the second tube section 22 so that the collet member 52 becomes disposed within the open end of the tube section 22 as best illustrated in FIG. 15. The collet member 52 and second tube section 22 are oriented as necessary so that the second tube section seam 25 is received in the longitudinal slot 85 in the collet member 52. There is sufficient clearance between the outer periphery of the collet member 52 and the inner surface of the second tube section 22 to permit relative longitudinal movement. This allows the second tube section 22 to be pushed toward the first tube section 21 to the position illustrated in FIG. 15.

Next, the second tube section 22 can be rotated about its longitudinal axis (with the collet member 52 engaging the tube seam 25) to any selected position to orient the tube section, and any attached components (e.g., the foot assembly 30) in a desired position. Then the screw 54 can be tightened. This causes the base member 50 and collet member 52 to become increasingly axially engaged to force the collet member 52 outwardly into tight engagement with the second tube section 22. The final tightened position of the connector assembly of the present invention is illustrated in FIG. 14.

The cooperating frustoconical surfaces on the base member 50 and collet member 52 function as cooperating wedge means for urging the collet member 52 increasingly radially outwardly to tightly engage the second tube section 22. It is to be noted that when the screw 54 is rotated to effect the increasing mating engagement between the base 50 and collet member 52, the nut 58 acts against the collet front wall surface 91. However, when the connector assembly components are in a untightened, loose position as illustrated in FIG. 15, movement of the nut 58 in the nut receiving cavity 87 is limited in the rearward axial direction by the surface 93 and in the forward axial direction by the surface 91.

With the novel structure of the present invention, the second tube section 22 can be readily adjusted even after the assembly has been completed. To this end, the screw 54 is merely rotated in the opposite, loosening direction. Then the second tube section 22 can be pulled slightly away from the first tube section 21 and rotated to a new desired position. Then the tube section 22 can be pushed forwardly again toward the first tube section 21 against the base member 50, and the screw 54 can be rotated in the tightening direction to again effect a tight engagement and joint.

It will be readily observed from the foregoing detailed description of the invention and from the illustrated embodiment thereof that numerous variations and modifications may be effected without departing from the true spirit and scope of the novel concepts or principles of this invention.

What is claimed is:

1. A connector assembly for connecting a first tube section to a second tube section that has a hollow tubular wall with an inwardly projecting longitudinal seam, said connector assembly comprising:
   a base member for being mounted to said first tube section;
   a collet member for being received in an open end of said second tube section and recessed completely within said second tube section to engage said second tube section and for being matingly engaged around said base member, said collet member defining a longitudinally oriented slot to receive said seam;
   fastener means for engaging said first tube section and having an extending threaded portion;
   threaded receiving means for threadingly receiving said fastener means threaded portion and urging said collet member axially into increasing mating engagement with said base member when said fastener means is rotated; and
   said base member and said collet member together defining cooperating wedge means for urging at least a portion of said collet member increasingly radially outwardly as said base member and said collet member are increasingly axially engaged to force said collet member into tight engagement with said second tube section.

2. The connector assembly in accordance with claim 1 in which said base member includes a saddle portion for being received on a cylindrical surface of said first tube section.

3. The connector assembly in accordance with claim 1 in which said base member includes a frustoconical mandrel having a frustoconical surface that defines, in part, said wedge means and in which said collet member has a frustoconical surface that is adapted to engage said mandrel frustoconical surface and that defines, in part, said wedge means.

4. The connector assembly in accordance with claim 1 in which said fastener means includes a machine screw for being disposed to extend through said first tube section with the head of said screw engaging a portion of said first tube section.

5. The connector assembly in accordance with claim 1 in which said threaded receiving means is adapted to bear against, but is separable from, said collet member.

6. The connector assembly in accordance with claim 1 in which said threaded receiving means is a nut.

7. The connector assembly in accordance with claim 6 in which said collet member defines a cavity for receiving said nut and for limiting the movement of said nut in opposite axial directions relative to said collet member.

8. The connector assembly in accordance with claim 1 in which at least a portion of said collet member is resiliently deformable.

9. The connector assembly in accordance with claim 8 in which said collet member includes radially oriented slots to facilitate outward deformation of at least a portion of said collet member.

10. A connected assembly of tube sections comprising:
    a first tube section;
    fastener means for engaging said first tube section and having an extending threaded portion;
    a base member mounted to said first tube section;
    a second tube section that has a hollow tubular wall defining an open end, said second tube section including a longitudinal seam protruding on the inside of said hollow tubular wall;
    a collet member received in said open end of said second tube section and recessed completely within said second tube section to engage said second tube section and for being matingly engaged around said base member, said collet member defining a longitudinally oriented slot to receive said seam;
    threaded receiving means for threadingly receiving said fastener means threaded portion and urging said collet member axially into increasing mating engagement with said base member when said fastener means is rotated; and
    said base member and said collet member together defining cooperating wedge means for urging at least a portion of said collet member increasingly radially outwardly as said base member and said collet member are increasingly axially engaged to force said collet member into tight engagement with said second tube section.

11. The connected assembly of tube sections in accordance with claim 10
    in which said first tube section is cylindrical; and
    in which said base member includes a saddle portion for being received on the cylindrical surface of said first tube section.

12. The connected assembly of tube sections in accordance with claim 11
    in which said base member defines a receiving aperture extending through said base member; and
    in which said fastener means includes a machine screw for being disposed to extend through said first tube section with the head of said screw engaging a portion of said first tube section and with the shank of said screw extending through said base member receiving aperture.

13. The connector assembly in accordance with claim 12 in which said base member includes a frustoconical mandrel having a frustoconical surface that defines, in part, said wedge means;
    in which said collet member has a frustoconical surface that is adapted to engage said mandrel frustoconical surface and that defines, in part, said wedge means;
    in which said collet member defines a receiving aperture for (1) being aligned with said base member receiving aperture when said base member and said collet member are matingly engaged and (2) receiving said screw shank;
    in which said threaded receiving means is a nut which is adapted to bear against, but which is separable from, said collet member; and
    in which said collet member defines a cavity for receiving said nut and for limiting the movement of said nut in opposite axial directions relative to said collet member.

14. A connector assembly for connecting a first tube section to a second tube section that has a hollow tubular wall, said connector assembly comprising:
    a base member for being mounted to said first tube section;

a collet member for being received in an open end of said second tube section and recessed completely within said second tube section to engage said second tube section and for being matingly engaged around said base member, said collet member defining a cavity for receiving a nut and for limiting the movement of said nut in opposite axial directions relative to said collet member;

fastener means for engaging said first tube section and having an extending threaded portion;

a nut for being disposed in said cavity for threadingly receiving said fastener means threaded portion and for urging said collet member axially into increasing mating engagement with said base member when said fastener means is rotated; and said base member and said collet member together defining cooperating wedge means for urging at least a portion of said collet member increasingly radially outwardly as said base member and said collet member are increasingly axially engaged to force said collet member into tight engagement with said second tube section.

15. The connector assembly in accordance with claim 14 in which said base member includes a saddle portion for being received on a cylindrical surface of said first tube section.

16. The connector assembly in accordance with claim 14 in which said base member includes a frustoconical mandrel having a frustoconical surface that defines, in part, said wedge means and in which said collet member has a frustoconical surface that is adapted to engage said mandrel frustoconical surface and that defines, in part, said wedge means.

17. The connector assembly in accordance with claim 14 in which said fastener means includes a machine screw for being disposed to extend through said first tube section with the head of said screw engaging a portion of said first tube section.

18. The connector assembly in accordance with claim 14 in which said collet member defines a longitudinally oriented slot to receive an interior seam of said second tube section.

19. The connector assembly in accordance with claim 14 in which at least a portion of said collet member is resiliently deformable.

20. The connector assembly in accordance with claim 19 in which said collet member includes radially oriented slots to facilitate outward deformation of at least a portion of said collet member.

21. A connected assembly of tube sections comprising:

a first tube section;

fastener means for engaging said first tube section and having an extending threaded portion;

a base member mounted to said first tube section;

a second tube section that has a hollow tubular wall defining an open end;

a collet member for being received in said open end of said second tube section to engage said second tube section and for being matingly engaged around said base member, said collet member defining a cavity for receiving a nut and for limiting the movement of said nut in opposite axial directions relative to said collet member;

a nut for being disposed in said cavity for threadingly receiving said fastener means threaded portion and for urging said collet member axially into increasing mating engagement with said base member when said fastener means is rotated; and said base member and said collet member together defining cooperating wedge means for urging at least a portion of said collet member increasingly radially outwardly as said base member and said collet member are increasingly axially engaged to force said collet member into tight engagement with said second tube section.

22. The connected assembly of tube sections in accordance with claim 21 in which said second tube section includes a longitudinal seam protruding on the inside of said hollow tubular wall; and in which said collet member defines a longitudinally oriented slot to receive said seam.

23. The connected assembly of tube sections in accordance with claim 21 in which said first tube section is cylindrical; and in which said base member includes a saddle portion for being received on the cylindrical surface of said first tube section.

24. The connected assembly of tube sections in accordance with claim 23 in which said base member defines a receiving aperture extending through said base member; and in which said fastener means includes a machine screw for being disposed to extend through said first tube section with the head of said screw engaging a portion of said first tube section and with the shank of said screw extending through said base member receiving aperture.

25. The connector assembly in accordance with claim 24 in which said base member includes a frustoconical mandrel having a frustoconical surface that defines, in part, said wedge means;

in which said collet member has a frustoconical surface that is adapted to engage said mandrel frustoconical surface and that defines, in part, said wedge means; and in which said collet member defines a receiving aperture for (1) being aligned with said base member receiving aperture when said base member and said collet member are matingly engaged and (2) receiving said screw shank.

* * * * *